Oct. 19, 1937. J. A. STREUN 2,096,208
COTTON DRIER
Filed May 11, 1936 2 Sheets-Sheet 1

Oct. 19, 1937.  J. A. STREUN  2,096,208
COTTON DRIER
Filed May 11, 1936  2 Sheets-Sheet 2
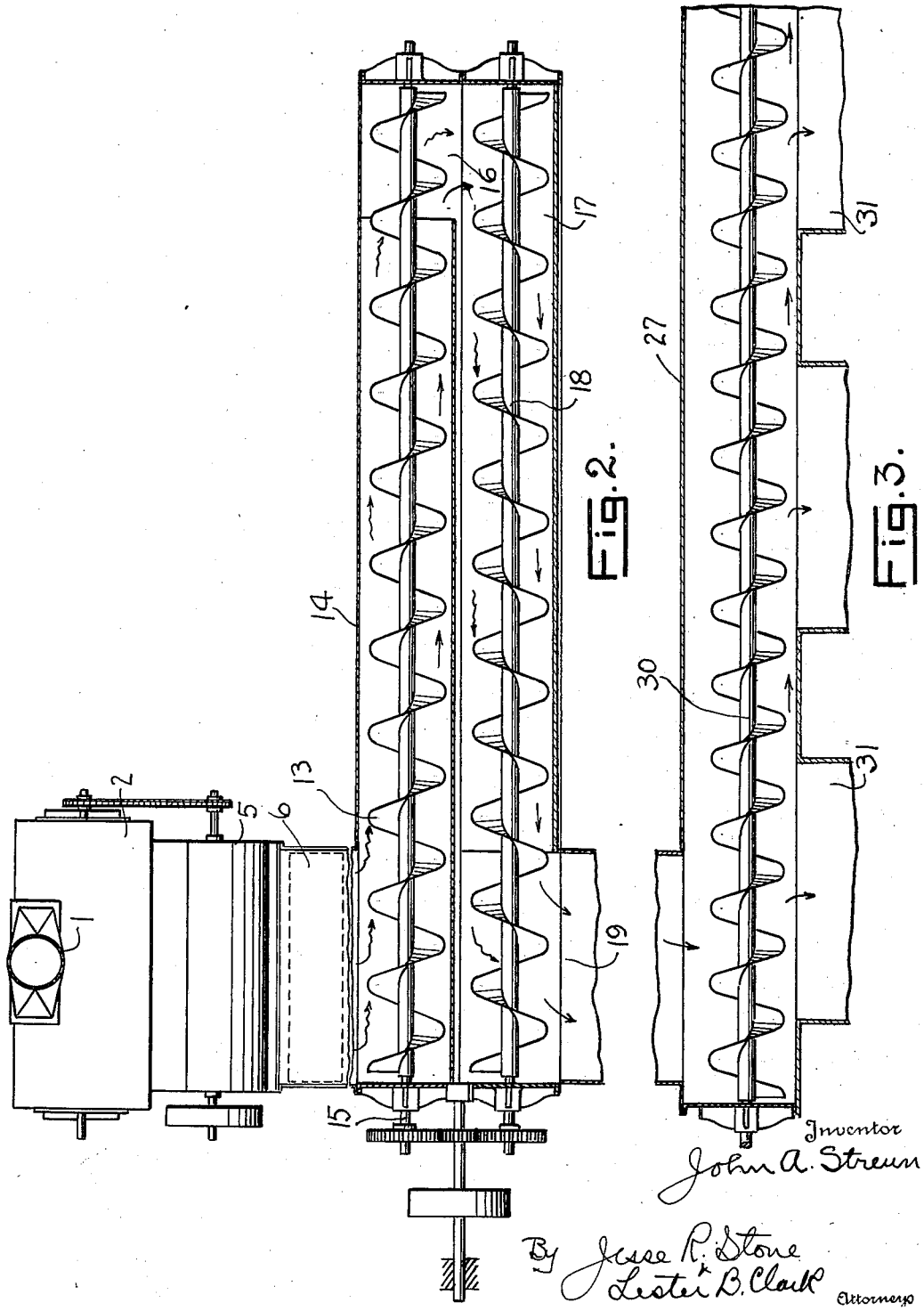

Patented Oct. 19, 1937

2,096,208

UNITED STATES PATENT OFFICE 2,096,208

COTTON DRIER

John A. Streun, Sherman, Tex., assignor to Hardwicke-Etter Company, a corporation Application May 11, 1936, Serial No. 79,036

2 Claims. (Cl. 19—74)

My invention relates to apparatus for drying cotton immediately preceding the moving of the cotton to the gin.

The device is adapted to act upon cotton which is drawn from the wagon or similar source and passed through drying and cleaning devices and then ginned.

It is an object of my invention to provide a drying apparatus which is adapted for acting upon the cotton before it is cleaned and during the time the cleaning operation is carried on.

I desire to submit the cotton to a thorough agitating and drying operation before any cleaning is done and to then further act upon the cotton while it is being cleaned and before it reaches the distributor.

It is a further object of my invention to so construct the drying apparatus that the cotton is most effectively submitted to the action of the dry heated air.

In the drawings herewith, Fig. 1 is an assembly view showing the arrangement of my cleaning apparatus, the cleaning device being partly in vertical section.

Fig. 2 is a front view showing the separator in elevation and the drying conveyer in central vertical section, parts of the device being eliminated to show the relative positions of these two parts.

Fig. 3 is a longitudinal section through the distributor.

Figure 1:
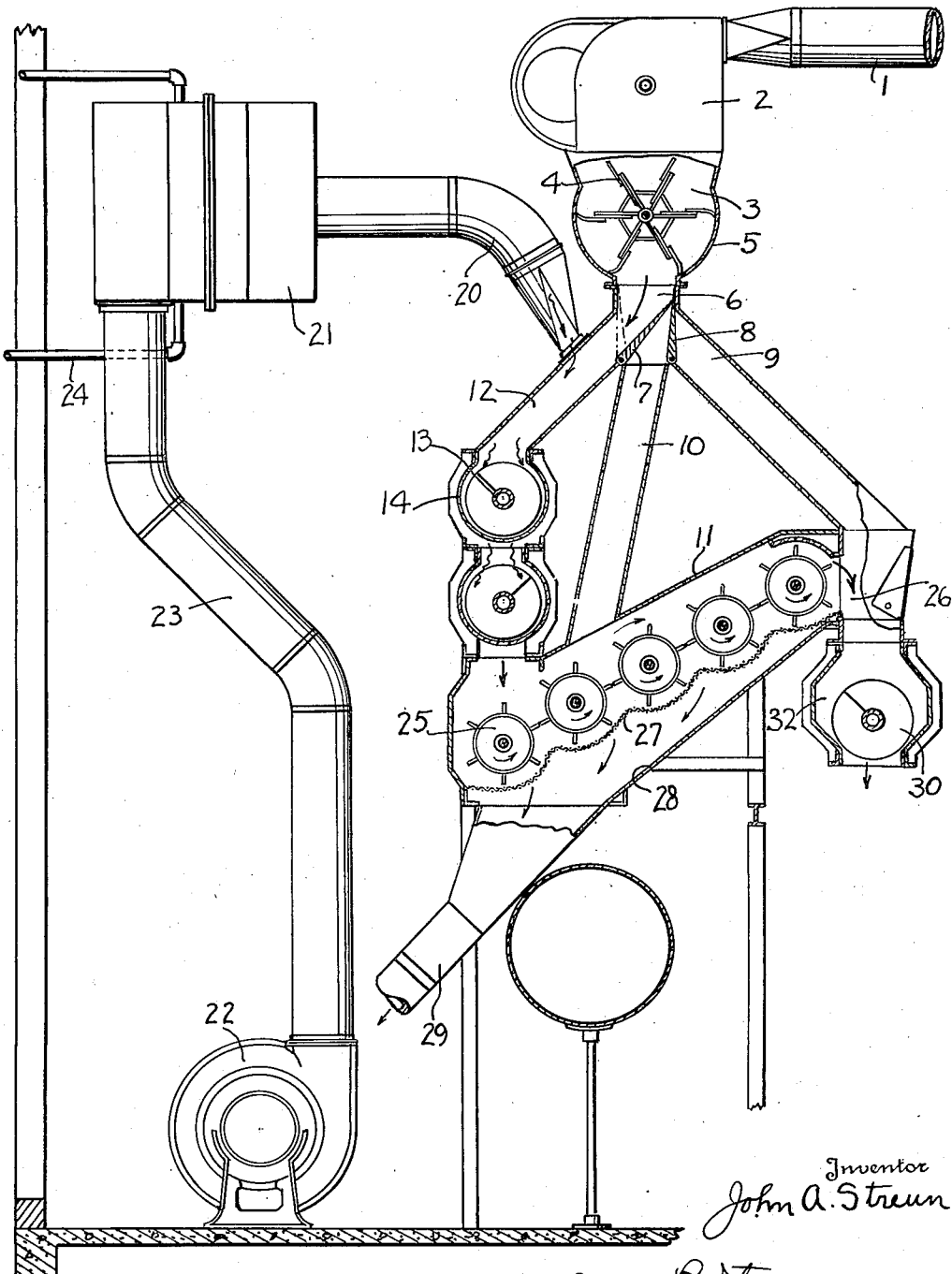

In the drawings I have shown a pipe 1 through which the cotton is drawn from the wagon or other source of supply to the treating device. This pipe comprises a flue through which a draft of air is drawn to suck the cotton up from the source of supply and move it to the separator 2. In this separator the cotton is separated from the air passing to the suction fan and is then delivered downwardly to the dropper 3. This dropper constitutes a rotating valve having radial flights 4 thereon which contact with the side walls of the housing 5 and prevent the passage of air upwardly into the separator.

The cotton passing downwardly from the dropper 3 passes into a valve chamber 6. This valve is arranged as a three-way valve. There is a lateral valve 7 and an opposite similar valve 8 both pivoted at their lower ends and when closed are in contact with the side walls of the chamber. As will be seen from Fig. 1, there are three passages leading from this chamber. One passage 9 leads directly to the distributor, another, 10, leads to the upper portion of the cleaner housing 11. The third, 12, leads to the drier. It will be seen that the valves are arranged so that the cotton may be delivered to any selected one of these three passages.

The passage 12 leads to the upper end of the drying conveyer and the cotton will pass directly onto a screw conveyer 13. As will be seen in Fig. 2, this screw conveyer fits closely within a cylindrical chamber 14, which is spaced closely to the outer circumference of the conveying blades. The shaft 15 upon which the conveyer is mounted is rotatable in a direction to carry the cotton away from the feeder and to the opposite end of the conveyer housing.

At the opposite end, the lower wall of the chamber is cut away to provide an opening 16 through which the cotton may drop down into a lower parallel chamber 17 within which the screw conveyer 18 is rotatable to move the cotton in a reverse direction back to the delivery opening 19 from which it passes to the chamber.

While the cotton is passing through the conveyer chambers it is acted upon by a draft of heated air. This air enters the passage 12 above the conveyers through a flue or pipe 20, which issues from one end of a drying chamber 21. The draft of air is blown from a fan 22 mounted on the floor of the gin housing blowing air through the pipe 23 leading by way of the drying chamber 21 to the pipe 20 previously noted. The heating chamber 21 may be of any desired form such as one heated by a steam coil coming from a source of supply through the pipe 24.

From the passage 12 the heated air enters with the cotton into the conveying chamber 14 where it follows the stream of cotton down through the conveying chamber. The conveyer allows little space for the passage of this draft of heated air except along the spiral path provided by the blades in their rotation. The cotton and the air therefore pass down through the conveyer chamber together and because of the spiral blades the cotton is turned over and over in its winding path so that the heated air engages the cotton on all sides and due to the agitation of the cotton, the effect of the drying air in the close passage through which it moves is most effective. Very little of the heated air can pass without moving along with the cotton itself. This is a feature of material value connected with the form of the drying apparatus.

It will be noted that the heated air takes the same route as does the cotton and is thoroughly mixed with the cotton when it is delivered through the opening 19 into the housing 11 of the cleaner.

The cleaner housing is arranged to accommodate a plurality of rotating agitator rolls 25 which, as seen in Fig. 1, are arranged in a series extending from the lower or entrance end thereof in an upwardly inclined direction to the outlet passage 26. Below the picker rolls which move the cotton upwardly to the outlet is a foraminated wall 27 which may be of screen wire which allows dust, chaff and small debris to settle out from the cotton and drop down to the lower inclined wall 28 of the housing and thus gravitate down to the outlet chute 29 for the dirt.

The stream of heated air passes with the cotton to the outlet and may be delivered with the cotton downwardly to the distributor 32. In the cleaner chamber the cotton is in a comparatively dry condition due to its passage through the drier and can be most effectively cleaned during its passage therethrough. It is also acted upon somewhat further by the heated air so that when it is delivered to the distributor 32 it is in a dry and clean condition so that it may be moved along to the gins.

The distributor 32 is of ordinary construction having an elongated trough or chamber in which is the screw conveyer 30. As will be seen from Fig. 3, this conveyer 30 moves the cotton along the trough and feeds it to a plurality of chutes or hoppers 31. There is one of these hoppers above each gin and additional feeding and cleaning apparatus may be provided above the gin to receive the cotton. This, however, forms no part of my present invention.

If the cotton when it is fed from the separator into the valve chamber is sufficiently dry so that no drying treatment is desired the valve 7 may be swung to its dotted line position so as to allow the cotton to move through the passage 10 directly to the cleaner.

Also when the cotton is sufficiently clean that no further cleaning is desired the two valves 7 and 8 may both be swung to the left of the position shown in Fig. 1, leaving the passage 9 open so that the cotton will pass directly down to the distributor without being acted upon by the drying and cleaning apparatus. I am thus enabled to subject the cotton to a maximum or minimum drying operation. The cotton may be thoroughly dried by passing through the drier or is subjected to only a partial drying in the cleaning chamber or it is possible to entirely eliminate any drying or cleaning action.

An important advantage of my invention lies in the arrangement of the apparatus so as to subject the cotton to the most effective action of the heated air. The air and cotton are both constrained to move through the conveyer chamber in a whirling spiral path whereby the cotton is rolled about and agitated and moved also partly by the action of the draft of air. I am thus enabled to get the full effect of the drying action of the air.

What is claimed as new is:

1. A cotton treating device including a drier, a cleaner connected with the outlet end of said drier, and a distributor to receive the cotton from said cleaner, a three way valve to direct cotton to said drier, said cleaner, or to said distributor, and means connected to said device below said valve to cause a draft of heated air downwardly through said drier and the cotton in said cleaner and out with the cotton to the distributor.

2. In a cotton drier, a valve housing, means to deliver cotton thereto, a drying chamber, a cleaner housing to receive cotton from said chamber, a distributor at the outlet end of said cleaner, valves in said valve housing to direct the cotton to said chamber, said cleaner housing, or to said distributor, and means to deliver a draft of heated air through said drier with said cotton to said cleaner and from said cleaner to said distributor.

JOHN A. STREUN.